April 4, 1950   J. H. NORMAN   2,502,982
DEVICE FOR CUTTING CAKE AND HANDLING THE CUT PIECES
Filed Oct. 21, 1947
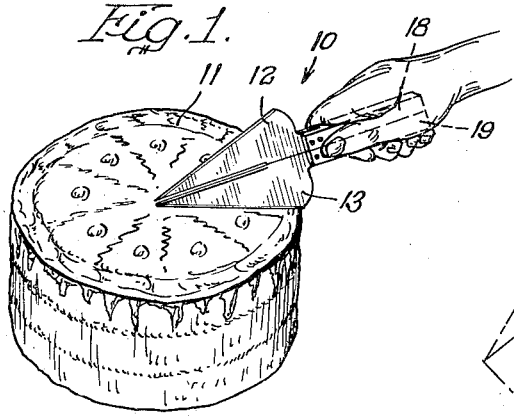
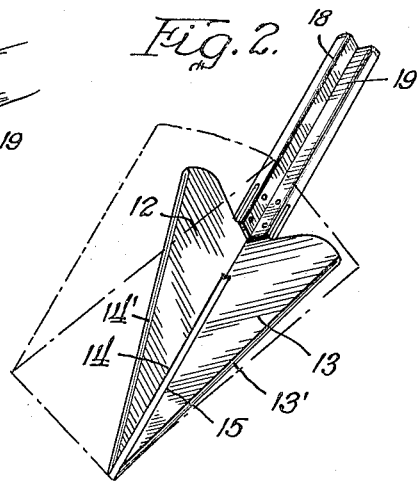
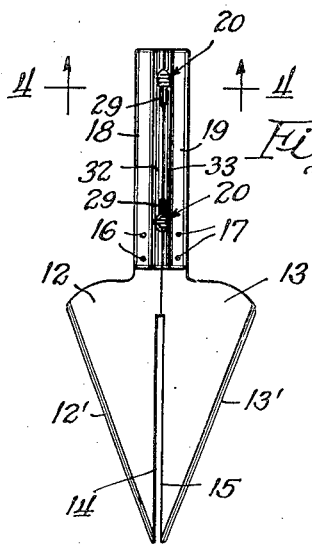
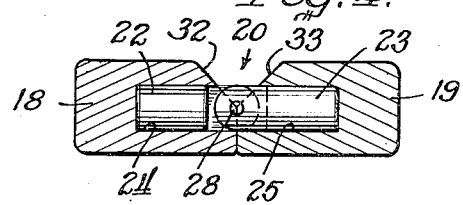
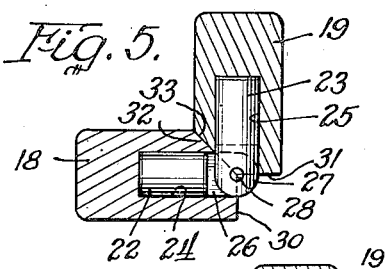
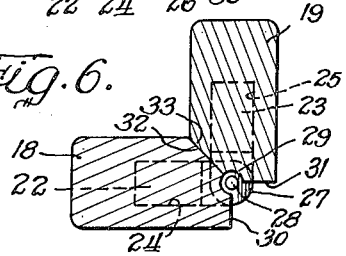
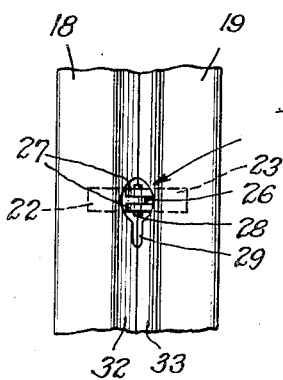
Inventor.
John H. Norman.

Patented Apr. 4, 1950

2,502,982

UNITED STATES PATENT OFFICE 2,502,982

DEVICE FOR CUTTING CAKE AND HANDLING THE CUT PIECES

John H. Norman, Elmhurst, Ill.

Application October 21, 1947, Serial No. 781,121

2 Claims. (Cl. 30—124)

My invention relates, generally, to cutting and handling devices and it has particular relation to devices for cutting cake and handling the cut pieces or like applications.

Among the objects of my invention are: To provide a device which can be operated in one position to cut a cake or the like into the desired number of pieces and which may then be manipulated to provide a means for conveniently picking up and holding a piece of the cut cake; to provide a two part cutting blade, each part being in the form of a wedge shaped member with juxtaposed edges, a handle for each of the blade sections, and means for hingedly interconnecting the handles; and to provide for limiting the movement of the handles so as to position the blade sections in either a coplanar position or a position at right angles to each other.

Other objects of my invention will, in part, be obvious and in part appear hereinafter.

My invention is disclosed in the embodiment thereof as shown in the accompanying drawing and it comprises the features of construction, combination of elements and arrangement of parts which will be exemplified in the construction hereinafter set forth and the scope of the application of which will be indicated in the appended claims.

For a more complete understanding of the nature and scope of my invention reference can be had to the following detailed description, taken together with the accompanying drawing, in which:

Figure 1 is a perspective view of my improved form of cake cutting device and illustrating how the same can be used for cutting a cake;

Figure 2 illustrates how the cake cutting device shown in Figure 1 can be operated to pick up and support a piece of cake after it has been cut, the cake being shown by the broken lines;

Figure 3 is a top plan view of my improved cake cutting device shown in the position for performing the cutting operation;

Figure 4 is a detail sectional view, at an enlarged scale, taken along the line 4—4 of Figure 3;

Figure 5 is a view, similar to Figure 4, but showing the handles positioned at right angles to each other rather than in coplanar relation as shown in Figure 4;

Figure 6 is a view, similar to Figure 5, but taken at a different section along the handles to show the details of construction; and Figure 7 is a top plan view of a section of the handles showing how the hinge pins can be inserted in the hinge members.

Referring now particularly to Figures 1, 2 and 3 of the drawing, it will be observed that the reference character 10 designates, generally, a cake cutting device which is constructed in accordance with my invention. In Figure 1 the device 10 is shown in position for cutting a circular cake 11 into the usual wedge shaped portions.

The cake cutting device 10 includes a pair of wedge shaped blades 12 and 13 which are formed preferably of corrosion resisting material such as stainless steel. The edges 12' and 13' of the blades 12 and 13 can be sharpened to provide cutting edges as desired. When the blades 12 and 13 are in the coplanar position as shown in Figures 1 and 3, they together provide a wedge shaped configuration either edge 12' or 13' of which can be used for cutting purposes.

Edges 14 and 15 of the blades 12 and 13 are juxtaposed. They may be spaced apart slightly, as illustrated, to prevent interference and to avoid the necessity for highly accurate assembly of the blades 12 and 13. The blades 12 and 13 may be secured, as by rivets 16 and 17, to handles 18 and 19 which are generally rectangular in cross section. The handles 18 and 19 can be formed of metal or plastic and can be moulded onto the blades 12 and 13. For example, they can be formed of stainless steel, aluminum or methyl methacrylate resin. Also, if desired, the blades 12 and 13 and the handles 18 and 19 can be formed of sterling or plated silver.

With a view to permitting the movement of the blades 12 and 13 from the coplanar position shown in Figure 3 to the perpendicular positions shown in Figure 2 the handles 18 and 19 are provided with hinges 20 near their ends. Any suitable type of hinge can be employed, the particular type disclosed herein being for illustrative purposes only.

The details of the construction of the hinges 20 are shown more clearly in Figures 4 through 7. As there shown each hinge 20 comprises pins 22 and 23 which have a drive fit with openings 24 and 25 in the handles 18 and 19. The pin 22 may have a single centrally located ear 26 and the pin 23 may have a pair of spaced ears 27 which interfit with the ear 26. A hinge pin 28 extends through the ears 26 and 27 to hold the handles 18 and 19 together while permitting their being rocked relative to each other. As shown in Figure 7, the handles 18 and 19 are slotted as indicated at 29 to permit insertion of the hinge pin 28.

Since it is desirable to hold the blades 12 and 13 in the coplanar position for cutting purposes, the handles 18 and 19 are provided with longitudinally extending flat surfaces 30 and 31 which are in engagement when the blades 12 and 13 occupy the coplanar position. The surfaces 30 and 31 serve as a stop to limit the relative movement of the handles 18 and 19 and the blades 12 and 13 in one direction.

The handles 18 and 19 also are provided with longitudinally extending beveled surfaces 32 and 33 which are inclined at angles of 45° to the surfaces 30 and 31. The surfaces 32 and 33 serve to limit the movement of the handles 18 and 19 toward each other when either blade 12 or 13 is swung to the perpendicular position relative to the other as shown in Figure 2.

When the device 10 is employed for cutting purposes, as shown in Figure 1, the handles 18 and 19 are held flat by positioning the thumb along the outer edges of the surfaces 30 and 31 with the fingers gripping the opposite sides of the handles. This prevents the blades 12 and 13 and the handles 18 and 19 from buckling or accidentally moving to the perpendicular position.

Since certain changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

I claim as my invention:

1. A cake cutting device comprising, in combination, a pair of juxtaposed blade members, a handle for each blade member constituting a longitudinal extension thereof, said handles being also juxtaposed along their sides, and hinge means interconnecting said handles along their juxtaposed sides whereby said blade members can be positioned in the same plane for cutting purposes and either blade can be inserted under the slice of cake and the other blade positioned to extend along one side of the slice of cake.

2. A cake cutting device comprising, in combination, a pair of juxtaposed blade members, a handle for each blade member constituting a longitudinal extension thereof, said handles being also juxtaposed along their sides, hinge means interconnecting said handles along their juxtaposed sides whereby said blade members can be positioned in the same plane for cutting purposes and in angular relation for lifting and holding a cut piece, and stop means for limiting the relative movement of said blades.

JOHN H. NORMAN.

REFERENCES CITED

The following references are of record in the file of this patent:

UNITED STATES PATENTS

| Number | Name | Date |
| --- | --- | --- |
| 400,537 | Barry | Apr. 2, 1889 |
| 2,219,374 | Spurney | Oct. 29, 1940 |
| 2,264,486 | Smith et al. | Dec. 2, 1941 |
| 2,322,046 | Miller | June 15, 1943 |